Patented Aug. 25, 1942

2,293,709

UNITED STATES PATENT OFFICE 2,293,709

DYESTUFFS OF THE ANTHRAQUINONE SERIES

Edwin C. Buxbaum, Swarthmore, Pa., assignor to E. I. du Pont de Nemours & Company, Wilmington, Del., a corporation of Delaware No Drawing. Application September 24, 1940, Serial No. 358,100

5 Claims. (Cl. 260—364)

This invention relates to the preparation of new dyestuffs of the anthraquinone series and more particularly to the preparation of new dyestuffs which dye wool and related fibers directly in gray shades.

With few exceptions, the acid wool dyestuffs of the anthraquinone series which are at present employed in the dyeing of wool and related fibers are simple anthraquinone compounds, i. e. compounds where only a single anthraquinone nucleus appears in the molecule. Several dianthraquinonylamino compounds have been suggested for use on wool but with few exceptions such dyes heretofore proposed from this class show poor tinctorial strength, light fastness properties or undesirable changes on chroming. Because of the poor dyeing properties generally exhibited by the compounds of the dianthrimide series heretofore considered for dyeing wool it has been assumed that the higher molecular weight trianthrimides would be of no value for this purpose; this assumption being supported by the fact that the straight trianthrimide such as that disclosed in U. S. Patent 863,397 when sulfonated is of no practical value as a wool dyestuff.

In the anthraquinone acid wool dyestuff field it has been difficult to find dyes which dye in desirable gray shades except those which are produced by the chroming of dyes which dye directly in other shades. While there are of course a few dyes of the anthraquinone series which dye wool and related fibers directly from an acid or neutral bath in gray shades as stated above, in general these dyes are not of desirable shade, or they are defective in light-fastness, tinctorial properties or show undesirable changes on chroming where such treatment is required for other purposes. A great deal of research has therefore been expended in an endeavor to find new dyestuffs of the anthraquinone series which will dye wool in desirable gray shades of good fastness properties.

It is therefore an object of the invention to produce new dyestuffs of the anthraquinone series which dye wool and related fibers directly in gray shades and which exhibit good dyeing and fastness properties, and which show relatively little change in shade on chroming.

In copending application Serial No. 358,099 filed September 24, 1940, new dyestuffs are described which dye wool and related fibers in desirable gray shades of desirable properties and which are arylaminotrianthrimides sulfonated in the aryl groups. I have found that other very desirable gray wool dyestuffs which exhibit good dyeing and fastness properties may be produced by substituting for the dihalogen-anthraquinone of the compounds of the copending application above mentioned a dihalogenbenzanthrone. The benzanthrone molecule which also contains the quinoid grouping gives dyes similar to those obtained with the dihalogen-anthraquinone. In the dyes of this series the sulfonation takes place readily with sulfuric acid of as low as 93% strength and at temperatures as low as 20° C., although oleum of as high as 65% may be employed when desired. The ease of sulfonation is due to the presence in the molecule of the arylamino groups of the benzene or naphthalene series which are readily susceptible of sulfonation. It is usually desirable that one sulfonic acid group be introduced for each aryl group present in the molecule.

These new dyestuffs are preferably prepared by condensing two moles of an aminoarylaminoanthraquinone with one mole of a dihalogenbenzanthrone. The condensation is effected by any of the processes employed for the preparation of the known anthraquinonylaminobenzanthrone compounds.

These diarylaminodianthraquinonylaminobenzanthrone sulfonic acids in which the aryl group is of the benzene or naphthalene series dye wool and related fibers directly in greenish-gray to neutral and reddish-gray shades which exhibit good fastness properties. They exhibit good tinctorial power and on chroming show very little change of shade.

Example 1

Thirty-one and four-tenths (31.4) parts of 1-amino-4-anilino-anthraquinone are reacted with 19.4 parts of 6-Bz-1-dibromo-benzanthrone in 500 parts of naphthalene in the presence of 50 parts of potassium acetate and 1 part of copper acetate at 210–215° C. for 8 hours. When the reaction is completed as evidenced by the discontinuance of the distillation of acetic acid and no further color change, the mass is cooled to 140° C. diluted with 1000 parts of solvent naphtha and held at 100° C. for two hours. The precipitated trianthrimide is filtered off, washed with solvent naphtha, alcohol and hot water. It corresponds to the following formula:

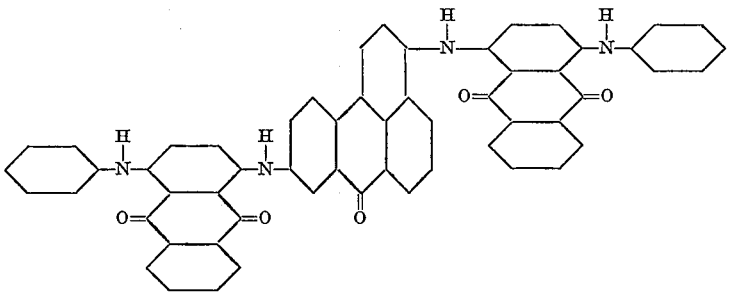

Ten (10) parts of the above compound are dissolved in 100 parts of sulfuric acid monohydrate at 25–35° C. When solution is complete which takes about one-half hour, there are added 100 parts of 25% oleum. The temperature is raised to 60–70° C. and held there until a drop of the sulfonation mass is completely soluble in warm water. The dyestuff is then precipitated by pouring it out into 1600 parts of ice and water, filtering and washing acid free with brine.

The color is dried at 100–110° C. The dyestuff so obtained is in the form of a gray powder which dissolves in water and dyes wool from an acid bath in greenish gray shades which exhibit good fastness properties and do not change appreciably on chroming.

These shades are entirely different from those obtained by the sulfonation of the product of one mole of Bz-1-bromo-benzanthrone and one mole of 1-amino-4-anilino-anthraquinone as described in F. P. 840,248, Sandoz, April 21, 1939.

Example 2

Thirty-eight and eight-tenths (38.8) parts of 6-Bz-1-dibromo-benzanthrone are reacted with 68.6 parts of 1-amino-2-methyl-4-paratoluidino-anthraquinone in 1000 parts of naphthalene in the presence of 100 parts of potassium acetate and 2 parts of copper acetate at 210–215° C. for 8 hours. When the reaction is finished, the mass is diluted with 2000 parts of solvent naphtha, held at 100° C. for two hours and then allowed to cool slowly to room temperature. The precipitated trianthrimide is filtered off, washed with alcohol, hot water and finally dried at 100–110° C. It corresponds to the following formula:

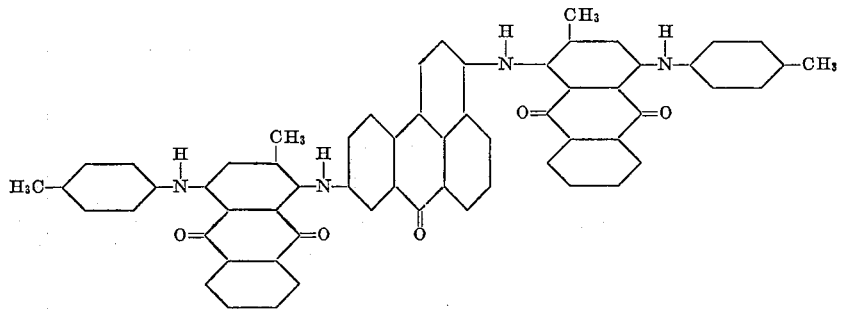

Ten (10) parts of the above compound are dissolved in 100 parts of 12.5% oleum at room temperature. The temperature is then raised to 60–70° C. until sulfonation is complete which usually takes about one-half hour. When this has occurred, the sulfonation mass is poured out into ice and water, filtered off and washed acid free with brine. It is dried at 100–110° C. The dyestuff so obtained dyes wool from an acid bath in reddish-gray shades which exhibit good fastness properties and show very little change on chroming.

Example 3

Thirty-eight and eight-tenths (38.8) parts of 6,Bz1-dibromobenzanthrone are reacted with 81.6 parts of 1-amino-2-bromo-4-paratoluidinoan-thraquinone in 1200 parts of naphthalene in the presence of 120 parts of potassium acetate and 2 parts of copper acetate at 210–215° C. for 8 hours. The reaction mass is then cooled to 140° C. and there are then added 1600 parts of solvent naphtha. The diluted reaction mass is held under agitation at 100–110° C. for two hours additional and then slowly cooled to 50° C. over a period of four hours. The precipitated product is filtered off, washed with 800 parts of solvent naphtha and then with 800 parts of ethyl alcohol. It is finally washed with hot water and dried. It corresponds to the following formula:

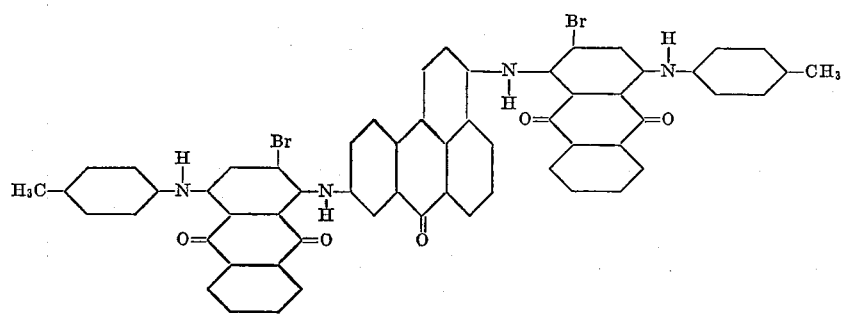

This compound dissolves in organic solvents with a bright green color. In sulfuric acid monohydrate it gives a violet colored solution which turns bluer as sulfonation becomes complete.

When sulfonated by any of the usual methods, a dyestuff is obtained which dyes wool in neutral gray shades of good fastness properties. Those compounds containing an alpha or beta naphthylamino group dye in similar shades of gray to those in which the aryl group is of the benzene series.

The condensation of the amino-arylamino-anthraquinone compounds with the dihalogen benzanthrones may be effected in any one of numerous media, such as hexalin, ortho-dichloro-benzene, nitro-benzene or other solvents in place of naphthalene used in the examples. If naphthalene is used, any one of numerous solvents can be employed for dilution in place of solvent naphtha, for instance, toluene, benzene or dioxan. Temperatures ranging from 125-225° C. may be used depending on the solvent and length of time condensed.

The amino-arylamino-anthraquinones employed may be any of those in which the arylamine group is of the benzene or naphthalene series, such as the amino-anilino-anthraquinones, the amino-toluidino-anthraquinones, the amino-xylidino-anthraquinones, the amino-naphthylamino-anthraquinones and those which contain other simple mono-substituents in either the aryl or anthraquinone groups, such as methyl, nitro, halogen and hydroxy groups. The benzanthrone nucleus may also contain simple monovalent substituents. An unsubstituted aminoanthraquinone or an aminoanthraquinone carrying monovalent substituents other than the arylamino group may be condensed on one end of the benzanthrone molecule, and aminoanthraquinones containing more than one arylamino group may be condensed on one or both ends of the benzanthrone molecule thereby giving dyes which contain one, two or more arylamino groups in the molecule.

The sulfonation can be carried out at temperatures ranging from 20° C. to 140° C. Sulfuric acid from 93% strength to 65% oleum can be used. The weaker acids require the higher temperatures while the stronger oleums effect sulfonation at lower temperatures.

The advantage of these trianthrimide dyestuffs is that they are fast to light, direct gray dyes which show very little difference either when dyed direct from an acid bath or chromed. In addition, they show good tinctorial power.

I claim:

1. Arylamino-dianthraquinonlylamino-benzanthrone sulfonic acids and their alkali metal salts in which the sulfonic acid radical is carried by the aryl group and the arylamino radical is attached to the anthraquinone nucleus and, in which the aryl group is of the benzene and naphthalene series.

2. Diarylamino - dianthraquinonylamino - benzanthrone sulfonic acids and their alkali metal salts in which the sulfonic acid radicals are carried by the aryl groups and in which one arylamino radical is attached to each anthraquinone nucleus in para position to the dianthraquinonylamino-benzanthrone linkage and in which the aryl group is of the benzene and naphthalene series.

3. 4',4''-dianilino - Bz -1,1'-6,1''-dianthraquinonylamino-benzanthrone sulfonic acids and their alkali metal salts.

4. 2',2''-dimethyl - 4',4'' - diparatoluidino - Bz- 1,1'- 6,1'' - dianthraquinonylamino - benzanthrone sulfonic acids and their alkali metal salts.

5. 2',2'' - dibromo - 4',4'' - diparatoluidino - Bz- 1,1'- 6,1'' - dianthraquinonylamino - benzanthrone sulfonic acids and their alkali metal salts.

EDWIN C. BUXBAUM.